United States Patent
Fukuoka (10) Patent No.: US 7,088,246 B2
(45) Date of Patent: Aug. 8, 2006

(54) RFID TAG AND METHOD FOR PROCESSING RFID DATA

(75) Inventor: Shinichiro Fukuoka, Kusatsu (JP)

(73) Assignee: Omron Corporation (JP)

( * ) Notice: Subject to any disclaimer, the term of this patent is extended or adjusted under 35 U.S.C. 154(b) by 195 days.

(21) Appl. No.: 10/627,872

(22) Filed: Jul. 28, 2003

(65) Prior Publication Data

US 2004/0065733 A1    Apr. 8, 2004

(30) Foreign Application Priority Data

Jul. 30, 2002    (JP) .............................. 2002-221841

(51) Int. Cl.
*G08B 13/14*    (2006.01)

(52) U.S. Cl. ................. 340/572.5; 340/10.1; 340/10.3; 340/572.1

(58) Field of Classification Search ............ 340/568.1, 340/568.6, 572.1, 572.2, 572.4, 572.5, 572.7, 340/825.54, 825.49, 10.31, 10.3, 10.2; 455/31.3; 380/34; 235/435, 385

See application file for complete search history.

(56) References Cited

U.S. PATENT DOCUMENTS

| | | | |
|---|---|---|---|
| 5,111,186 A * | 5/1992 | Narlow et al. | 340/572.5 |
| 5,446,447 A * | 8/1995 | Carney et al. | 340/572.4 |
| 5,602,538 A * | 2/1997 | Orthmann et al. | 340/10.2 |
| 6,354,493 B1 * | 3/2002 | Mon | 235/380 |

FOREIGN PATENT DOCUMENTS

JP    2000-151480    5/2000

* cited by examiner

*Primary Examiner*—Brent A. Swarthout
(74) *Attorney, Agent, or Firm*—Dickstein Shapiro Morin & Oshinsky LLP (57) ABSTRACT

A collision prevention relational function is disclosed for RFID tags, which increases stability during system operations. The RFID tag includes a parallel resonance circuit having a coil, a resonance capacitor, an adjustment capacitor, a switching circuit, a rectification circuit, a smoothing capacitor, a constant-voltage circuit, a voltage detection circuit, an exclusive OR circuit, a timer circuit, a voltage detection circuit, a control circuit, an OR circuit, a latch circuit, an UID storage device, and a data modulator/demodulator. When a predetermined power supply voltage/operating voltage is obtained, an anti-collision algorithm identifies and adjusts RFID tags that experienced collision.

9 Claims, 8 Drawing Sheets

RFID TAG AND METHOD FOR PROCESSING RFID DATA

The present invention relates to RFID tags and an RFID interrogator making use of the same.

BACKGROUND OF THE INVENTION

Figure 1:
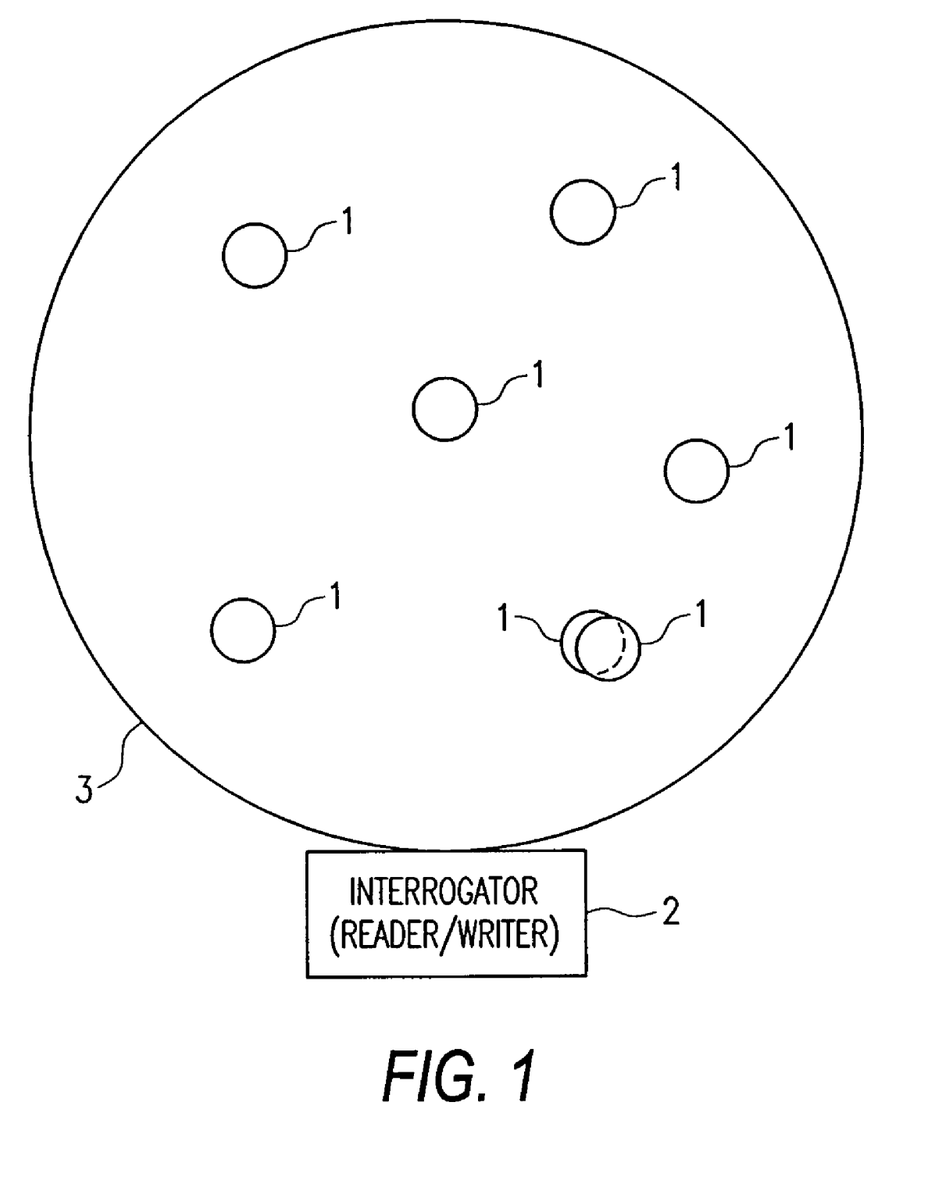
FIG. 1 illustrates an outline of a prior art system comprising RFID tags and a RFID interrogator making use of such tags.

FIG. 1 illustrates a typical RFID system comprising of a plurality of RFID tags 1 affixed to a detection area 3, associated with an interrogator (reader/writer). The detection area 3 is typically configured to operate within a predetermined field, where the field reads tags 1 present within a detection area 3.

When RFID tags 1 are affixed to items such as books, envelopes, casino chips, and so on, problems occur when tags 1 overlap one another. In such cases, communication performance is degraded significantly and the tags cannot effectively access to the interrogator (reader/writer) 2. Overlaps typically occur when RFID tags 1 stack on one another (denoted by the dotted line in FIG. 1), or when spacing between various tags 1 is set to be very small.

In such cases, the inductance of the resonance coil (Ls) of certain tags 1 interconnect with each other to form mutual inductance, and the inductances of the tags 1 link with the mutual inductance to become exceedingly large. Since resonance capacitors (not shown) present in the tags 1 assume a fixed value, the resonance frequency (i.e., expected resonance frequency and the frequency prescribed by the interrogator) decreases as compared with those in a state free of interconnection.

Furthermore, oscillation is performed on a side of the interrogator (reader/writer) 2 at the same frequency as the expected resonance frequency of the tags 1. Any off-resonance magnetic fields from the side of the interrogator (reader/writer) 2 would then be supplied to the tags 1. In turn, the resonance point of the tags 1 would be decreased due to the overlapping, and the supplied energy is correspondingly decreased. As a result, communication range is decreased.

In order to eliminate a decrease in communication range due to overlapping of the tags 1, JP-A-2000-151480 discloses an identification system where a plurality of tags overlap one another. The document describes a configuration in which capacitors, housed in tags, are switched over to be able to modify a resonance frequency. Furthermore, a method is described in which an internal capacitor switches over for every tag among the plurality of overlapped tags to perform adjustment to a desired frequency. Resonance frequencies of other tags are sequentially modified after the completion of communication with one tag.

Under this method, a resonance frequency of a certain tag can be conformed to a resonance frequency issued by an interrogator, but resonance frequencies of other tags are offset from the resonance frequency issued by the interrogator. Accordingly, a general collision preventive procedure (e.g., JIS 6323-3 ISO/IEC15693-3, or the like) is not used, and interrogator and tags perform communication in 1 to 1.

In addition, there is no method of determining the sequence of a plurality of tags, which tag adjustment of resonance frequency should be performed from, and there is caused a problem that a stable operation is difficult to be ensured in a practical system and so difficult to realize.

BRIEF SUMMARY OF THE INVENTION

An exemplary RFID tag configuration, which makes effective use of a collision prevention relational function (called "anti-collision") and which is relatively simple in construction and can realize a stable system operation, and a RFID interrogator, is disclosed herein.

When a coil inductance L of an RFID tag overlaps other tags to generate a mutual inductance, an L value is correspondingly increased. Accordingly, a C value for resonance is decreased in response to an increment of L to keep a resonance frequency constant at all times. The decrease in the C value alleviates the problem of an insufficient increase in power supply voltage. In addition, a plurality of resonance capacitors are also provided, where these resonance capacitors are configured under a certain condition and are separated from one another, whereby a capacitor value is decreased and that decrease in resonance frequency, which is affected by an increase in mutual inductance, is corrected.

The invention provides an RFID tag comprising inductance and a plurality of resonance capacitances to form a resonance circuit, a switching circuit for turning on and off one or more of the plurality of resonance capacitances, a power circuit for smoothing a power signal provided from an interrogator (reader/writer) via the resonance circuit to output a constant voltage, a voltage detection circuit for detecting a voltage of the smoothed signal, a voltage monitor circuit for monitoring a rate, at which the smoothed signal rises, a resonance capacitive switching command circuit for turning on/off the switching circuit in response to an output of the voltage monitor circuit when a predetermined rise is not obtained, and anti-collision information output circuit for outputting anti-collision information in response to a command from the interrogator.

The resonance capacitances comprise a fixed capacity and at least one or more adjustment capacitances and when the resonance capacitances are increased in resonance frequency, the adjustment capacitances are separated therefrom to reduce the resonance capacitances in capacitance value whereby control is performed to make the resonance frequency approach a resonance frequency prescribed by the interrogator.

Further, the voltage monitor circuit comprises a first voltage detection circuit for outputting a detection output when the constant voltage circuit outputs a low voltage signal (V1), a timer circuit, which receives an output of the first voltage detection circuit to output a timer signal for a predetermined period of time, a second voltage detection circuit for outputting an output when an output of the constant voltage circuit reaches a voltage (V2) capable of a circuit operation. When an output of the second voltage detection circuit is not obtained during a period of time during which a timer signal is output by the timer circuit, the switching circuit is driven to reduce resonance capacitances while a switching circuit returns the resonance circuit to an initial state (i.e., when the voltage (V2) capable of a circuit operation cannot be reached).

The voltage monitor circuit sequentially separates the adjustment capacitances during predetermined periods of time when there are a plurality of adjustment capacitances, and returns the resonance circuit to the initial state in the case where all the adjustment capacitances are separated and the operating voltage (V2) cannot be reached. The RFID tag then has a resonance frequency adjusted by the resonance circuit to make the resonance frequency approach that of the interrogator (reader/writer). With the frequencies matched, power received by the resonance circuit may stably execute data communication with the interrogator (reader/writer).

Further, an exemplary method is disclosed that performs data processing among RFID tags and an interrogator (reader/writer), wherein a predetermined number of a tags are divided into sections having a character length of time slot numbers expressed in binary numerals. The divided sections are defined to issue commands containing mask data and mask length. The predetermined number of RFID tags are then compared with mask data on the basis of the command, and only the RFID tags whose numbers correspond to the mask data send back a timing sequence in accordance with a time slot value set on a high order bit of mask length. The interrogator (reader/writer) then receives a reply from the RFID tags, stores positions where time slots involve collision, stores the proper numbers of RFID tags where time slots involve no collision, and executes an access command to select RFID tags to restrict those tags. The interrogator issues a stop operation command, when a power source is not reset, and subsequently stores positions of time slots which involve collision to mask data to add to mask length an amount corresponding to areas. The interrogator advances to a next area, issues additional collision preventive commands, repeats these processes, and subsequently returns an amount by which an area shifts when time slots involve no collision. Processing is then executed with respect to data that involves collision in a previous area, and a collision preventive processing algorithm is performed when the processing is finally returned to an initial area.

A method of performing data processing among RFID tags and an interrogator (reader/writer) is also provided, wherein a command having a code indicates time slots for RFID tags to prevent collision and to show the location of data, that is desired to be read from RFID tags. The RFID tags comprise a simple-type collision preventive procedure, in which individual RFID tags receive the command to determine a response timing of sending-back from positions indicated by the proper numbers on the basis of data of positions corresponding to slots while referring to the number of time slots, which are beforehand arranged by the RFID tags and the interrogator (reader/writer) from a position indicated by the command, among ID numbers assigned to least significant integers (LSIs) of the RFID tags.

The method of performing data processing of RFID tags and an interrogator (reader/writer), according to the invention, can use anti-collision correspondence function to identify RFID tags.

These and other features and advantages of the invention will be more clearly seen from the following detailed description of the invention which is provided in connection with the accompanying drawings.

DETAILED DESCRIPTION OF THE INVENTION

Figure 2:
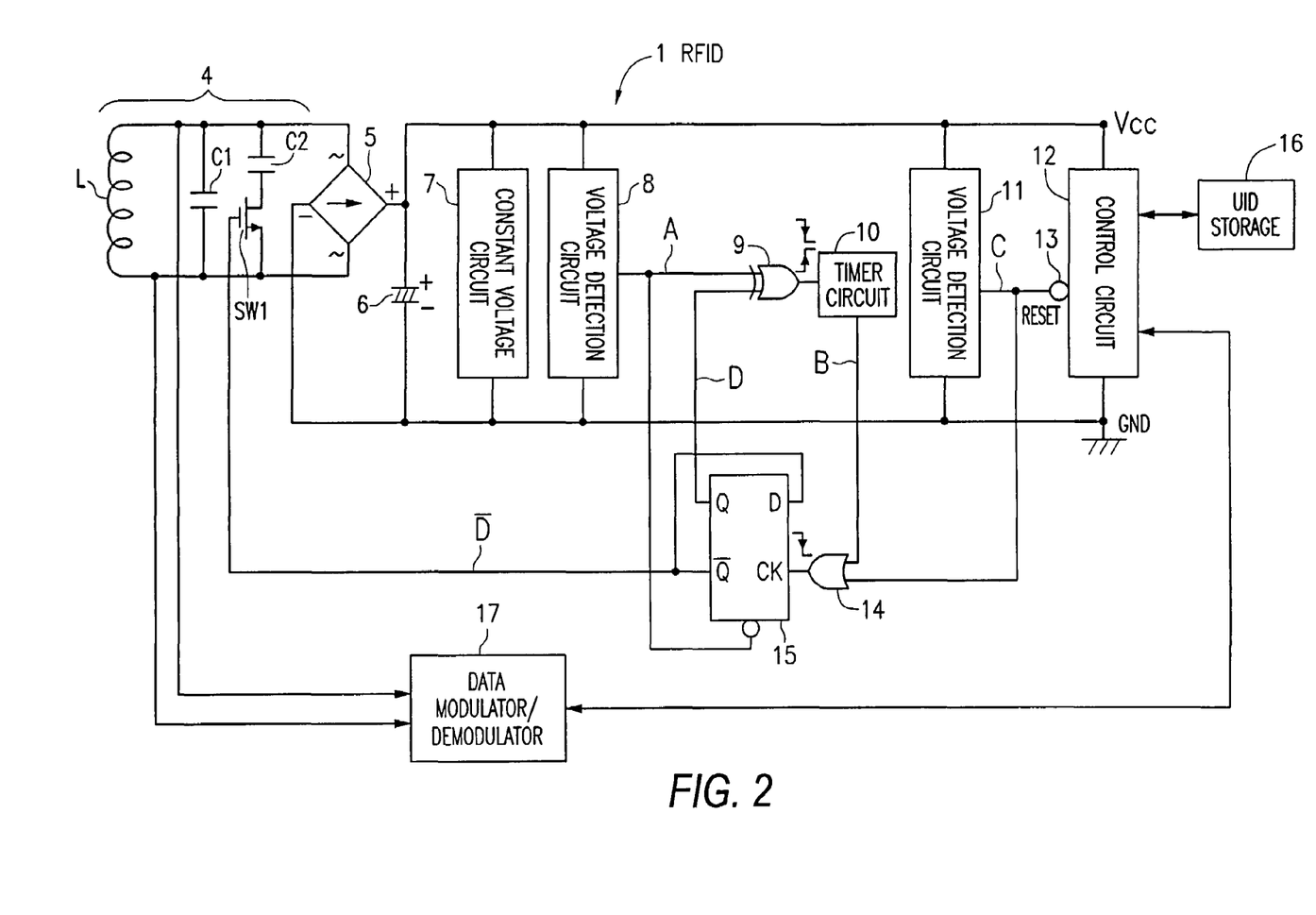
FIG. 2 is an exemplary block diagram showing a portion RFID tag system.

FIG. 2 illustrates an RFID tag 1, where voltage detection circuits 8, 11 are referred to as a voltage monitoring portion, latch circuit 15 is referred to as a resonance capacitive switching command portion, and a control circuit 12, UID storage circuit 16, and a data modulator/demodulator 17 are referred to as anti-collision information output circuit portion. Coil L, resonance capacitor C1, and an adjustment capacitor C2 constitute a parallel resonance circuit 4. Switching circuit SW1 is preferably formed on a semiconductor substrate, such as a CMOS-FET, is set to be on in an initial state.

The adjustment capacitor C2 and the resonance capacitor C1 of FIG. 2 are connected parallel to each other and are contained in the resonance circuit 4. The resonance circuit 4 resonates when it enters into a high-frequency field, located in detection area 3, generated by an antenna of an interrogator (reader/writer) 2, and its resonant output is applied to a rectification circuit 5. It should be noted that the adjustment capacitor C2 in FIG. 2 can be a single capacitor, or may be split up into multiple capacitive elements. By using multiple capacitors, finer tuning adjustments may be made with respect to the anti-collision system.

The rectification circuit 5 outputs DC voltage that corresponds to a degree of coupling between the RFID tag 1 and an antenna of the interrogator (reader/writer) 2. The DC is smoothed by a smoothing capacitor 6 and stabilized by a constant-voltage circuit 7. The output of the constant-voltage circuit 7 is preferably not stabilized until a predetermined period of time has elapsed after the RFID tag 1 enters the detection area 3. Likewise, the output Vcc of the constant-voltage circuit 7 is not made stable at the beginning of entry.

Various commands received from the interrogator (reader/writer) 2 via the coil L are demodulated by the data modulator/demodulator 17. Demodulated commands are supplied to the control circuit 12 to be subjected to further processing. The control circuit 12 collates UID contained in the commands and UID of UID storage circuit 16, and outputs a signal to the data modulator/demodulator 17.

The data calling demand and data writing demand are received from the interrogator (reader/writer) 2, via the coil L, where the data modulator/demodulator 17 and the control circuit 12 reads demanded data from the UID storage circuit 16 to output the called data, or to write demanded data into the UID storage circuit 16.

When receiving a demand for inhibition of command response from the interrogator (reader/writer) 2, the control circuit 12 sets an inhibition mode to inhibit a response to a command as long as electric power is supplied.

Figure 3:
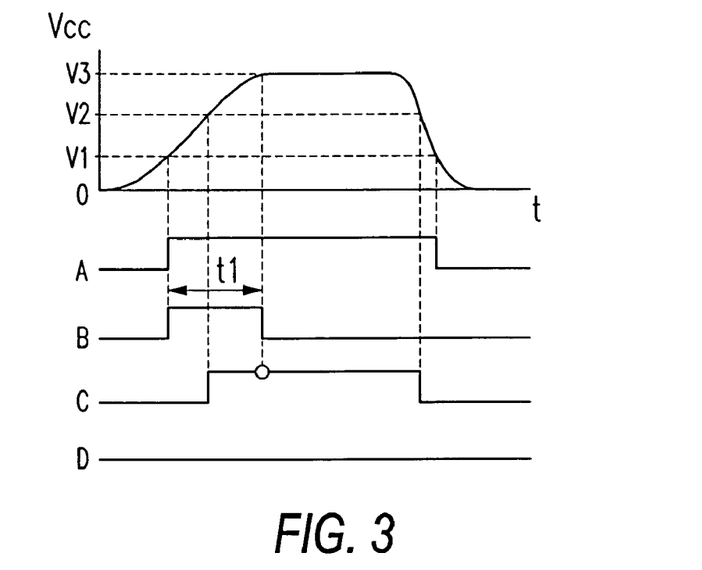
FIG. 3 is a view showing a waveform of the RFID tag according to an exemplary embodiment of the invention.
Figure 4:
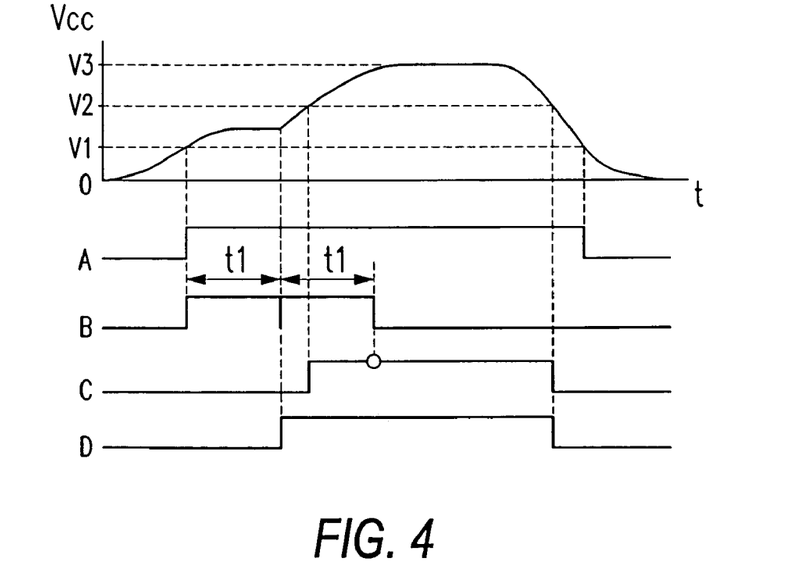
FIG. 4 is a view showing another waveform of the RFID tag according to an exemplary embodiment of the invention.
Figure 5:
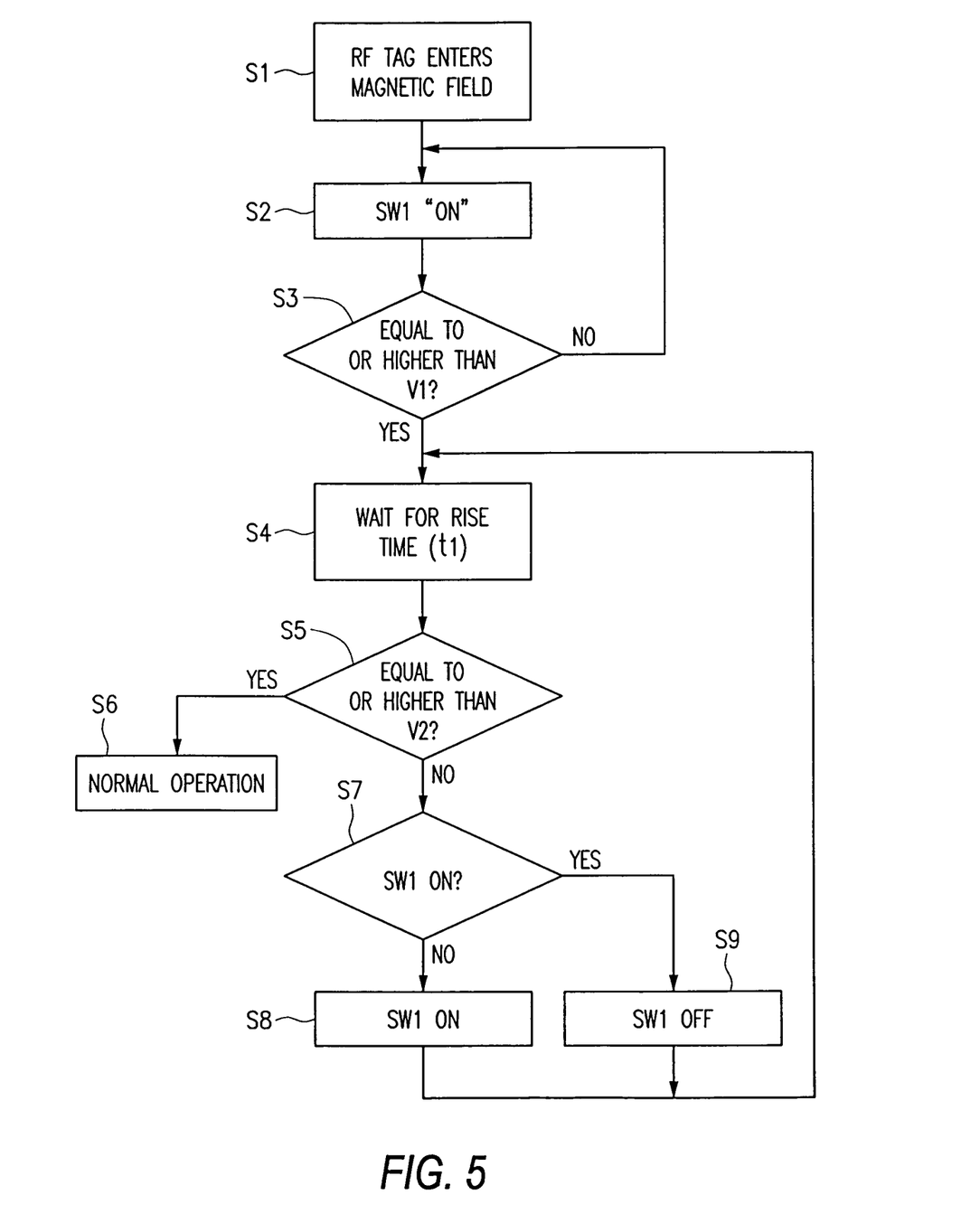
FIG. 5 is a flowchart showing an operation of an RFID tag according to an exemplary embodiment of the invention.

The invention is now described with additional reference to the waveform diagrams illustrated in FIGS. 3 and 4 and the flowchart illustrated in FIG. 5. FIG. 3 illustrates an exemplary waveform, where a constant-voltage output Vcc is set initially 0. As the RFID tag 1 enters the detection area 3, Vcc rises (STEP S1). At this point the switch SW1 is on (STEP S2). And when a voltage V1 is reached, the voltage V1 is detected by the first voltage detection circuit 8, and the voltage detection circuit 8 starts a detection output (illustrated as "A" in FIG. 3)(STEP S3).

The output "A" is applied to a timer circuit 10 via an exclusive logical add (exclusive OR) circuit 9. The timer circuit 10 is triggered when the input rises or drops, and during this time outputs a time interval signal "B" shown in FIG. 3 of a predetermined timer time t1 (STEP S4).

When the RFID tag 1 enters the detection area 3 of the interrogator (reader/writer) 2 and operates normally, the constant-voltage output Vcc reaches a high voltage state V2 during the course of time t1 (STEPs S5, S6). The voltage V2 is detected by the second voltage detection circuit 11 and causes a detection output "C" to rise as shown in FIG. 3. The detection output "C" is applied to a reset terminal 13 of the control circuit 12. Signal "C", applied to the reset terminal 13, rises whereby the control circuit 12 can perform its proper action, such as access to the interrogator (reader/writer) 2, or the like. In other words, when the signal C is on a low level, the control circuit 12 is held in a reset state, and its output portion is at least immobilized so that no unwanted signal is output.

FIG. 4 illustrates an example when the RFID tag 1 enters the detection area 3 (STEP S1) of the interrogator 2 under abnormal conditions (e.g., when a plurality of RFID tags 1 overlap one another and/or are disposed in positions relatively distant from the interrogator (reader/writer) 2). Under these conditions, voltage Vcc does not rise smoothly as compared with the waveform shown in FIG. 3. In cases where RFID tags 1 overlap one another, the power supply voltage Vcc reaches voltage level V1 (STEP S3), but cannot reach a voltage V2 after the timer time t1 has elapsed (STEP S4). Under this condition, output C (FIG. 2) of the voltage detection circuit 11 for detecting the voltage V2 remains on a low level (STEP S5).

Meanwhile, when the timer time t1 has elapsed, an output B of the timer circuit 10 (FIG. 2) drops and is shown in FIG. 4, and the drop is applied to a clock terminal CK of the latch circuit 15 via an OR circuit 14, so that an output D of the latch circuit 15 is reversed. In this manner, when an output of the latch circuit 15 is reversed, an output (inverted D) connected to the switching circuit SW1 is reversed to low from high, and the switching circuit SW1 is put in an OFF state (STEPs S7, S9).

As a result, the adjustment capacitor C2 is cut off from the resonance circuit 4, and a resonance frequency of the resonance circuit 4 increases to approach a resonance frequency prescribed by the interrogator (reader/writer) 2. Accordingly, the power supply voltage Vcc rises as shown in FIG. 4. When the power supply voltage Vcc reaches an operating voltage V2 of the circuit, an output C of the voltage detection circuit 11 shown in FIG. 4 changes to high from low in the same manner as described in the previous example, so that the control circuit 12 is put in an operative state (STEPs S4, S5, S8). Thereby, a pertinent RFID tag 1 can be put in a state to be able to have access to the interrogator (reader/writer) 2.

In some cases, the RFID tags 1 move to enter the detection area 3, where a large distance exists between the RFID tags 1 and the interrogator (reader/writer) 2. When the distance becomes too great, the operating voltage level V2 is not reached but a voltage V1, at which the timer circuit 10 is triggered, is reached. In this case, when the switching of the adjustment capacitor C2 is made, the compensating operation causes a resonance frequency of the RFID tag 1 to shift from a desired resonance frequency. Once shifted, the communication range of the affected RFID tag will greatly decrease.

To minimize this effect, an operation is performed where the timer circuit 10 is again timed up, a state of which operation is indicated by a signal of a waveform "B" shown in FIG. 4. That is, in the case where the power supply voltage Vcc reaches an operating voltage V2 in the course of the timer time t1 for a second time, an output B of the timer circuit 10 drops while an output C of the voltage detection circuit 11 remains. Therefore, an output of the OR circuit 14 drops. As a result, a state of the latch circuit 15, to the clock terminal CK of which an output of the OR circuit 14 is applied, is again reversed, and the switching circuit SW1 is put in an ON state to cause connection of the adjustment capacitor C2, so that the resonance circuit 4 is returned to an initial state.

Thereby, the RFID tags 1, in which the power supply voltage Vcc cannot reach an operating voltage V2, move to approach the interrogator (reader/writer) 2, the power supply voltage Vcc will rise. When the power supply voltage Vcc rises to reach an operating voltage V2, the operating voltage V2 is detected by the voltage detection circuit 11 and the control circuit 12 is set in a state to be able to have access to the interrogator (reader/writer) 2.

In this manner, even in the case where RFID tags 1 overlap and superpose one another as shown in, for example, a part of FIG. 1, respective resonance frequencies can be made to approach a frequency prescribed by the interrogator (reader/writer) 2. Accordingly, a voltage value of the power supply voltage Vcc is ensured, and an access state can be comparatively simply set, in which transmission and reception of signals can be made between the respective RFID tags 1 and the interrogator (reader/writer) 2.

Next, an explanation will be given to an anti-collision (recognition of a plurality of transponders) technique for discriminating among respective RFID tags 1. Background material on anti-collision techniques can be found in Japanese Industrial Standards (JIS) X6323-3 (ISO/IEC15693-3) "IC cards without external terminals—neighborhood type—Third section: prevention of collision and transmission protocol".

Using an exemplary anti-collision algorithm described below, an inventory of transponders (RFID tags 1, 1, 1, . . . ) present in a communication area 3 of the interrogator (reader/writer) 2 are extracted on the basis of UIDs. The interrogator (reader/writer) 2 detects the existence of other transponders (RFID tags) by executing an algorithmic process. The RFID tags identify the existence of other transponders according to information located in the reader/writer 2.

Figure 6:
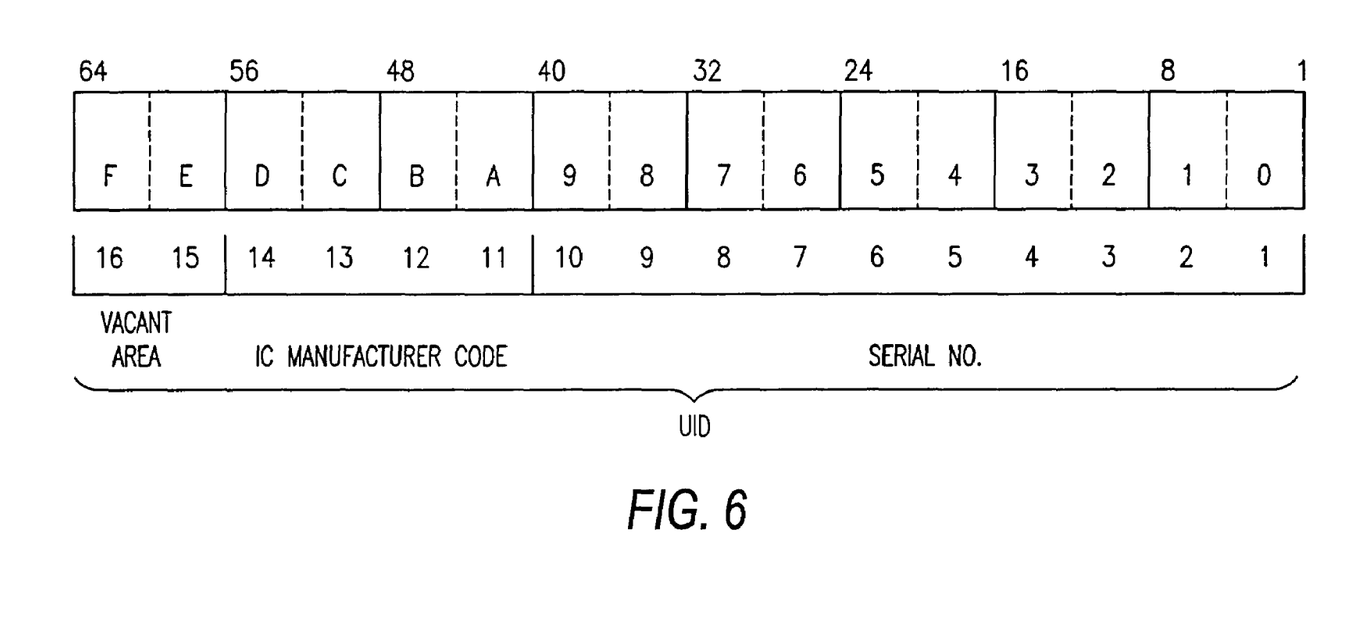
FIG. 6 is a view showing information of UIDs (proper numbers of tags) for discrimination of RFID tags according to an exemplary embodiment of the invention.

FIG. 6 shows UID information that is used in the interrogator (reader/writer) 2 to discriminate among the respective RFID tags. In the FIG. 6 embodiment, UIDs are composed of 64 bits, and a character length of time slot number in binary numeral defines an area as shown in FIG. 6. Since the time slot number is 16 in the exemplary embodiment, the area is divided in a unit of 4 bits, and UIDs are divided into 16 areas. The UIDs set the respective RFID tags using 56 bits in 14 areas, using the IC manufacturer code and serial number. The manufacturing code is composed of 4 areas, (A, B, C, and D), of IC manufacture's codes and 10 areas of serial numbers (0–9), in a unique manner, and are written and preserved in the control circuit 12 of the RFID tag 1.

Figure 7:
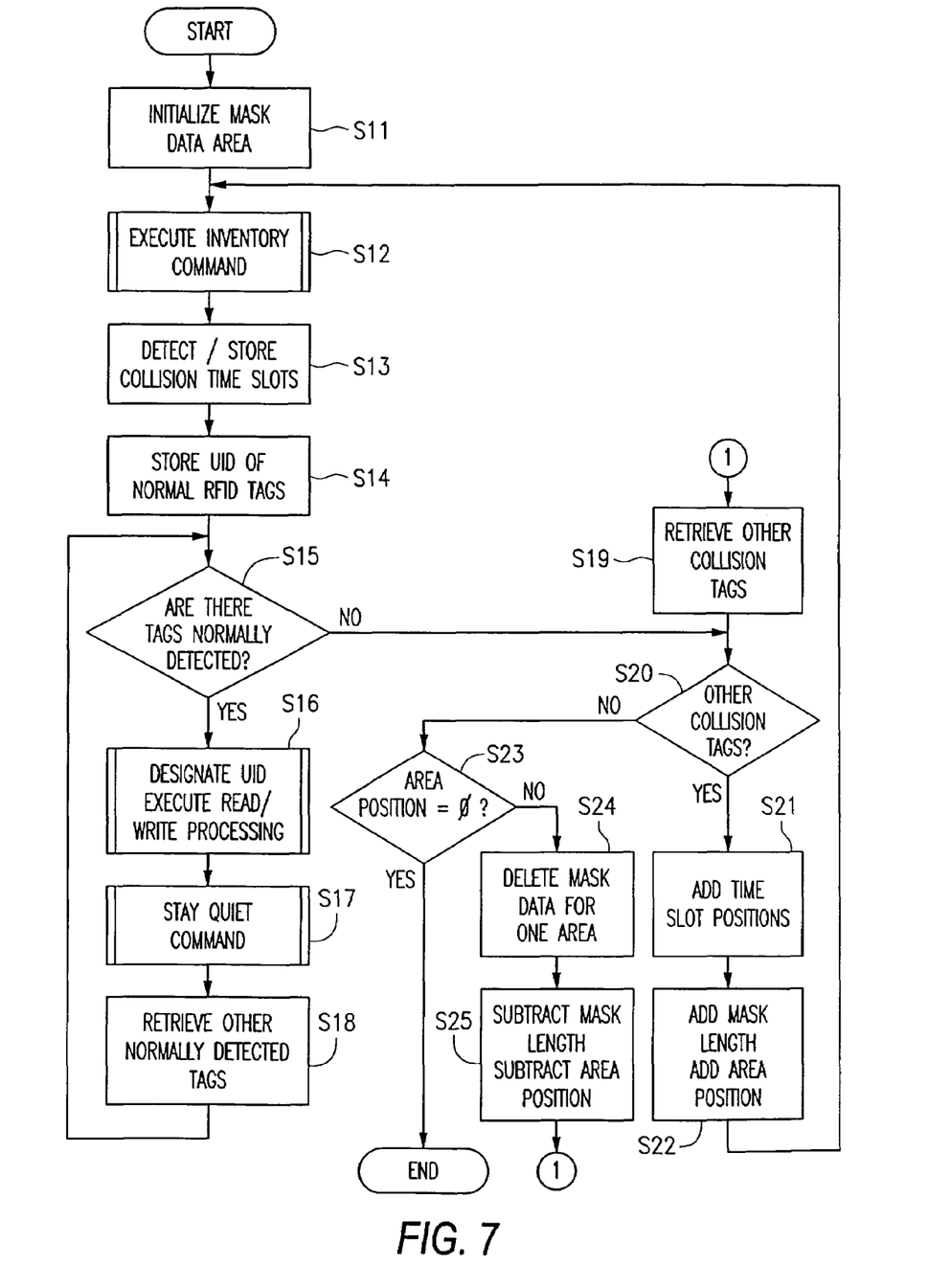
FIG. 7 is an operation flowchart of an exemplary anti-collision sequence.

FIG. 7 illustrates an exemplary anti-collision sequence. The operation flowchart shown in FIG. 7 indicates the contents of a program stored in the interrogator (reader/ writer) 2 to be executed. Here, a typical anti-collision sequence will be described in the case where the time slot number is 16.

First, an area (mask data area), in which mask relational data of the interrogator is stored, is initialized in STEP S11. In this initialization, mask length data is set at 0, mask value data is set at a predetermined value, and area position data representative of positions, in which UIDs (proper data) stored in RFID tags are operated, are also set at 0.

When preparations for issuing a command are made in this manner, the reader/writer 2 subsequently sends an inventory command in STEP S12. As a result, the inventory command is sent to a plurality of RFID tags 1. The respective RFID tags 1 have a mask length set to 0, and they independently return a response to the interrogator (reader/writer) 2 with their time slot timings, which are determined in the area of 0 in UIDs. Accordingly, responses from the UIDs from RFID tags 1 to the interrogator are susceptible to collision.

Figure 8:
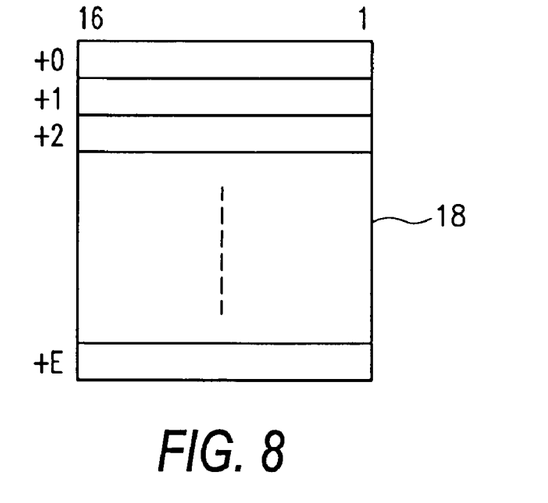
FIG. 8 illustrates area storage of an exemplary collision slot buffer.

To minimize this effect, STEP S13 of FIG. 7 detects time slot positions in which collision occurs by detecting signals on sides of those RFID tags 1, which respond to the inventory command. The detected time slot positions are stored in a collision slot buffer 18, formed in the interrogator (reader/writer) 2, shown in FIG. 8. As will be described later, this is intended for distinguishing RFID tags 1 that are susceptible to collision.

Figure 9:
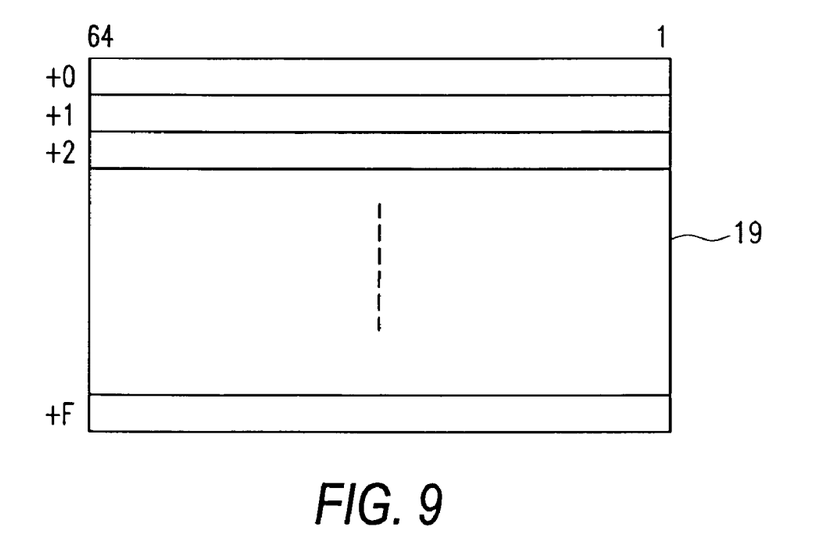
FIG. 9 illustrates data storage of an exemplary detection UID buffer.

In the case where no collision occurs, these tags are detected as normal in the STEP S14, and then the UID data of the pertinent RFID tags 1 is stored and held in a detection UID buffer 19 shown in FIG. 9. The detection UID buffer 19 is also formed in the interrogator (reader/writer) 2. In this manner, time slot data involving collision and UID data are accumulated in the buffers 18, 19 of the interrogator (reader/writer) 2.

Subsequently, in the case where normally detected tags are present, STEP S15 confirms the normally detected tags and the next control is executed STEP S16. In STEP S16, the contents of the detection UID buffer 19 are accessed, and the interrogator (reader/writer) 2 designates UIDs to specify pertinent tags to which the interrogator will exchange data with.

After the interrogator exchanges data with a selected tag(s), a STAY QUIET command is sent to the pertinent RFID tags 1 in STEP S17 to stop an operation. When an electric source is reset, the access to the pertinent RFID tags 1 is terminated for the time period, and the procedure shifts to a state equivalent to a state in which the pertinent RFID tags 1 are not existent (no inventory).

Subsequently, the existence of other detected RFID tags 1 is retrieved in STEP S18, and in the case where other RFID tags 1 are detected in STEP S15, STEPs S16–18 are repeated, and the processing for each of the pertinent RFID tags 1 is executed as shown in FIG. 7. When the processing for normally detected RFID tags 1 is wholly terminated, judgment in STEP S15 results in "NO" and control is transferred to STEP S20.

In STEP S20 of FIG. 7, contents of the collision slot buffer 18 are accessed to judge whether RFID tags 1 involving collision are present or not. When it is detected that there has been collision, judgment in STEP S20 determines "YES", and processing for identifying tags involving collisions with the use of UIDs are executed in STEP S21 and the following STEPs.

More specifically, first time slot positional data among time slots in which collision occurs, is stored as mask relational data in STEP S21. In the present embodiment, 16 time slots are present as described above in FIG. 6, and collision will be assumed in two locations, that is, a time slot 1 and a time slot 4. Under this example, binary data (0001) is stored as the first time slot positional data. The data (0001) is also stored as mask value data.

In the subsequent STEP S22, +4 (0100) is added to a mask length, which was initially set to 0 (see STEP S11). As a result, the mask length is set at 4 bits. Also, +1 (0001) is also added to an area position. Accordingly, an area 1 (see FIG. 6) of UID is selected as positional data, by which a subsequent time slot is designated.

In this manner, when a condition for execution of a subsequent inventory command is prepared, control is transferred to STEP S12. The subsequently executed inventory command will be updated to make the mask length 4 (0100), the mask value as 1 (0001), and area position of UID as 1 (0001). Thus an inventory command of updated contents is executed. Since the value (0001), for which collision has previously occurred once, is included as a new mask. When multiple tags are involved in a collision, a plurality of RFID tags 1 are stored.

When an inventory command is again executed, STEPs S15, S16, S17, S18 are correspondingly repeated for the remaining tags. Thereby, having access to the interrogator (reader/writer) 2 is completed for normally detected RFID tags 1, and those RFID tags 1, for which access cannot be completed due to collision, are gradually decreased. Accordingly, even if tags involved in collision remain after a second execution of an inventory command, control is again transferred to STEP S20 and judgment results in "YES". Subsequently, the processing for updating of an inventory command in STEPs S21, S22 is executed, and a third inventory command is correspondingly executed in STEP S12.

When the processing for updating of mask position is repeated and tags involving collision run out, judgment in STEP S20 results in "NO", and control is transferred to STEP S23. A processing for repeating STEPs S24, S25 and STEP S19 is executed for returning an area position. This is directed to covering any void generated in the same area position when collision occurs in a plurality of slots. A series of processes are executed and an anti-collision sequence is completed at a point in time when an area position is returned to 0. By repeating such processing, it is possible to substantially drop the RFID tags 1 left, to which access cannot be had due to collision.

Figure 10:
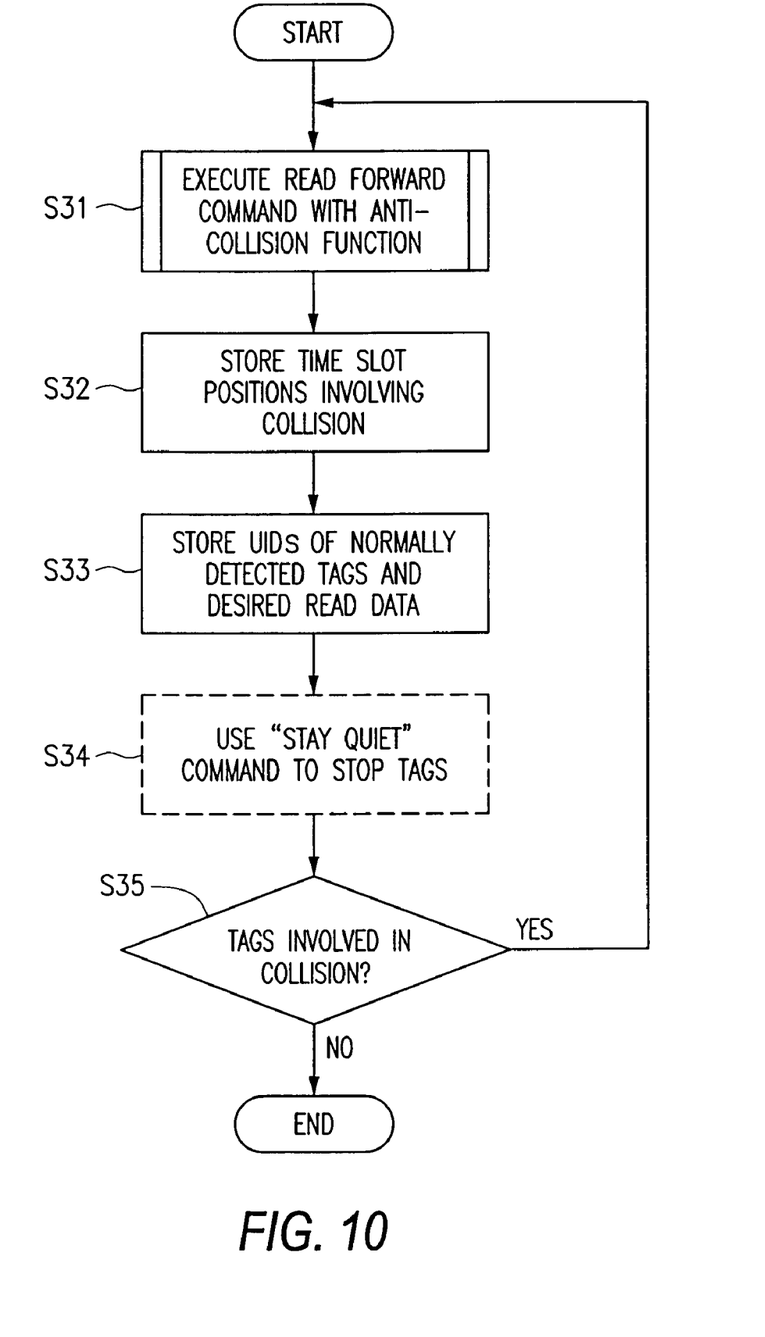
FIG. 10 is a flowchart illustrating an operation of a collision correspondence algorithm according to an exemplary embodiment of the invention.

FIG. 10 illustrates an exemplary collision correspondence algorithm. In the flowchart shown in FIG. 10, the anti-collision algorithm shown in FIG. 7 is simplified and a read forward command with a collision preventive function is executed in STEP S31. In addition, a command having a code as to what number of proper IDs of tags a slot for prevention of collision should be started from, and a code indicative of a location of data, which is desired to be read from tags, is issued as the command. As a result, time slots involving collision, UIDs normally detected, and a desired read data are stored and held as in STEPs S32, S33.

Still referring to FIG. 10, where collision occurs between tags, judgment in STEP S35 results in "YES", and the read forward command with the collision preventive function in STEP S31 is again executed. In this case, the algorithm shown in the flowchart of FIG. 7 is not executed but a subsequent command is executed in STEP S31. That is, the subsequent command is executed by shifting a slot beginning position to a subsequent position.

In this manner, when the slot beginning position is simply shifted, it is not possible to completely eliminate another occurrence of collision between the same RFID tags 1. However, as described previously, each of the respective RFID tags 1, are given a unique UID in 56 bits (composed of an IC manufacture's code and a serial number), and when a command for movement of the slot beginning position is executed, the processing is repeated several times following the second time. Through repeated iterations, the respective RFID tags can be identified, and minimize problems in an ordinary application.

The system configuration is simplified to make maintenance easy, and speed of access between the RFID tags 1 and the interrogator (reader/writer) 2 can be increased. Thus, when RFID tags 1 and the interrogator (reader/writer) 2 move relative to each other, the reliability in giving and taking of signals is improved. In such case, the collision preventive algorithm can be positively adopted by selecting a condition for the application.

As described previously, the anti-collision correspondence algorithm is loaded on the RFID tags and the switching circuit for switching ON/OFF of resonance capacity is provided on the RFID tags. Therefore, when a certain power supply voltage/operating voltage is obtained on a side of the RFID tags, the anti-collision correspondence algorithm can surely identify individual RFID tags. Therefore, a stable operation can be ensured even when changes in resonance frequencies are comparatively roughly set, the whole system can be simply improved in reliability and is very high in practicability.

While the invention has been described in detail in connection with exemplary embodiments known at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. Accordingly, the invention is not limited by the foregoing description or drawings, but is only limited by the scope of the appended claims.

What is claimed is:

1. An RFID tag comprising:
    a resonance circuit for receiving a power signal and a command signal;
    a switching circuit, said switching circuit turning on and off the resonance circuit;
    a power circuit for smoothing said power signal, said power circuit outputting a constant voltage;
    a voltage monitor circuit for monitoring a rate at which the constant voltage signal rises;
    a resonance capacitive switching circuit for turning on/off the switching circuit in response to an output of the voltage monitor circuit when a predetermined rise is not obtained; and
    anti-collision means for outputting anti-collision data in response to a received command.

2. The RFID tag according to claim 1, wherein said resonance circuit comprises an inductance device and a plurality of capacitive devices having a resonant frequency.

3. The RFID tag according to claim 2, wherein the command signal includes a predetermined resonant frequency signal.

4. The RFID tag according to claim 3, wherein the capacitive devices comprise a fixed capacitive device and at least one or more variable capacitive devices.

5. The REID tag according to claim 4 wherein the variable capacitive devices are adjusted to make the resonance frequency of the capacitive devices approach a resonance frequency of an interrogator.

6. The RFID tag according to claim 1, wherein the voltage monitor circuit comprises:
    a first voltage detection circuit for outputting a detection output when the constant voltage circuit outputs a low voltage;
    a timer circuit, which receives an output of the first voltage detection circuit to output a timer signal for a predetermined period of time; and
    a second voltage detection circuit for outputting a second detection output when an output of the constant voltage circuit reaches an operating voltage.

7. The RFID tag according to claim 6, wherein the switching circuit is driven to reduce the resonance frequency of the capacitive devices when an output of the second voltage detection circuit does not reach the operating voltage during a first predetermined period of time.

8. The RFID tag according to claim 7, wherein the switching circuit returns the resonance frequency to an initial state when a voltage capable of a circuit operation cannot be reached.

9. The RFID tag according to claim 7, wherein the voltage monitor circuit sequentially separates any different resonance frequencies of the variable capacitive elements during a second predetermined period of time and returns the resonance circuit to the initial state when all the resonance frequencies are separated and the operating voltage cannot be reached.

* * * * *